(12) United States Patent
Penha et al.

(10) Patent No.: US 9,195,720 B2
(45) Date of Patent: Nov. 24, 2015

(54) REQUESTING SEARCH RESULTS BY USER INTERFACE GESTURE COMBINING DISPLAY OBJECTS

(71) Applicant: Google Inc., Mountain View, CA (US)

(72) Inventors: Henrique Dias Penha, San Francisco, CA (US); Mark Brophy, London (GB); Mathew Inwood, London (GB); Mikkel Crone Koser, Vanlose (DK); Thomas Jenkins, London (GB); Adam Skory, London (GB); Bjorn E. Bringert, Bath (GB); Hugo B. Barra, San Francisco, CA (US); Andrew Anderson Stewart, Fife (GB); Robert W. Hamilton, San Francisco, CA (US)

(73) Assignee: Google Inc., Mountain View, CA (US)

( * ) Notice: Subject to any disclaimer, the term of this patent is extended or adjusted under 35 U.S.C. 154(b) by 205 days.

(21) Appl. No.: 13/829,520

(22) Filed: Mar. 14, 2013

(65) Prior Publication Data

US 2014/0280049 A1 Sep. 18, 2014

(51) Int. Cl.
*G06F 17/30* (2006.01)
(52) U.S. Cl.
CPC .... *G06F 17/30554* (2013.01); *G06F 17/30967* (2013.01)
(58) Field of Classification Search
CPC ................ G06F 17/30864; G06F 17/30867
USPC ......................... 707/722, 736, 758
See application file for complete search history.

(56) References Cited

U.S. PATENT DOCUMENTS

| 7,917,489 B2 * | 3/2011 | Mukherjee ........ G06F 17/30672 707/707 |
| 7,996,362 B2 * | 8/2011 | Shimada ........... G06F 17/30247 707/626 |
| 8,271,472 B2 * | 9/2012 | de Morentin Martinez ........... G06F 17/30864 707/707 |
| 8,463,756 B2 * | 6/2013 | Sarshar ............. G06F 17/30784 707/690 |
| 8,656,314 B2 * | 2/2014 | Locker ................ G06F 3/04883 345/173 |
| 2009/0112862 A1 | 4/2009 | Mo |
| 2011/0016150 A1 * | 1/2011 | Engstrom ......... G06F 17/30265 707/778 |
| 2011/0029934 A1 | 2/2011 | Locker et al. |
| 2011/0043437 A1 | 2/2011 | Tang et al. |
| 2011/0064301 A1 | 3/2011 | Sun et al. |

OTHER PUBLICATIONS

International Search Report and Written Opinion in International Application No. PCT/US2014/017390, mailed Jun. 3, 2014, 11 pages.

* cited by examiner

*Primary Examiner* — Rehana Perveen
*Assistant Examiner* — Loc Tran
(74) *Attorney, Agent, or Firm* — Fish & Richardson P.C.

(57) ABSTRACT

Methods, systems, and apparatus, including computer programs encoded on computer storage media, for receiving, from a user device, data indicating a user performed a user input gesture combining a first display object in a plurality of display objects with a second display object in the plurality of display objects; identifying attributes that are associated with both the first display object and the second display object; and performing a search based on the attributes.

24 Claims, 5 Drawing Sheets

REQUESTING SEARCH RESULTS BY USER INTERFACE GESTURE COMBINING DISPLAY OBJECTS

BACKGROUND

This specification relates to user interfaces for search engines.

Internet search engines aim to identify resources, e.g., web pages, images, text documents, multimedia content, that are relevant to a user's needs and have high quality content. Internet search engines generally return a set of search results that identify particular resources in response to a user-submitted query and present information about the particular resources in a manner that is intended to be useful to the user.

SUMMARY

This specification describes user interface technologies that can be used by a user to combine representations of entities to display search results common to their shared attributes. Each entity is a data element that represents a person, place, thing, or concept.

In general, one innovative aspect of the subject matter described in this specification can be embodied in methods that include the actions of receiving, from a user device, data indicating a user performed a user input gesture combining a first display object in a plurality of display objects with a second display object in the plurality of display objects; identifying attributes that are associated with both the first display object and the second display object; and performing a search based on the attributes.

Implementations can include one or more of the following features. The user input gesture comprises (i) input representing a user dragging the first display object to overlap the second display object, and (ii) input representing the user releasing the first display object while the first display object overlaps the second display object. Performing the search comprises: sending, to a search engine, a search request comprising one or more search terms for each attribute; receiving search results from the search engine in response to the search request; and providing the search results for displaying on the user device. Retrieving first data for the first display object and second data for the second display object, where the first data and the second data each represent an association between a searchable entity and the respective object; where identifying attributes comprises identifying attributes of each searchable entity that is associated with both searchable entities. The first display object and the second display object are a first image and a second image, respectively, and where identifying attributes comprises: identifying visual similarities between the first image and the second image, where the visual similarities comprise similarities in color, texture, or shape; and identifying attributes that represent the visual similarities. Identifying attributes comprises: identifying a first entity associated with the first display object, wherein the first entity is a data element that represents a first person, place, thing, or concept; identifying a second entity associated with the second display object, wherein the second entity is a data element that represents a second person, place, thing, or concept; and identifying attributes that are associated with both the first person, place, thing, or concept and the second person, place, thing, or concept. Prior to the identifying, receiving one or more additional user input gestures, where each additional user input gesture combines a corresponding display object with the first display object or the second display object, and where identifying attributes comprises identifying attributes that are associated with the first display object, the second display object, and each of the one or more corresponding display objects. The user input gesture comprises input representing a user dragging the first display object to overlap the second display object, further comprising: in response to performing a search based on the attributes, receiving search results based on the search; determining that one or more of the search results satisfy a threshold score; sending, to the user device, response data representing the determination, where the user device displays a visual indication of the response data.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In particular, one embodiment may include all the following features in combination.

The subject matter described in this specification can be implemented in particular embodiments so as to realize one or more of the following advantages. After receiving data indicating a user performed user input for dragging a first object onto a second object and releasing the first object, a system can provide search results that are associated with both the first object and the second object. The system can process the search results for the first object and the second object in response to one gesture, e.g., one drag and drop motion. After receiving, from a user device, data indicating a user dragged the first object onto the second object, the system can provide an indication, to the user device, as to whether an entity associated with the first object and an entity associated with the second object have attributes in common. The system can also process user input gestures that combine more than two objects. That is, the system can provide search results that are associated with all of the combined objects.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
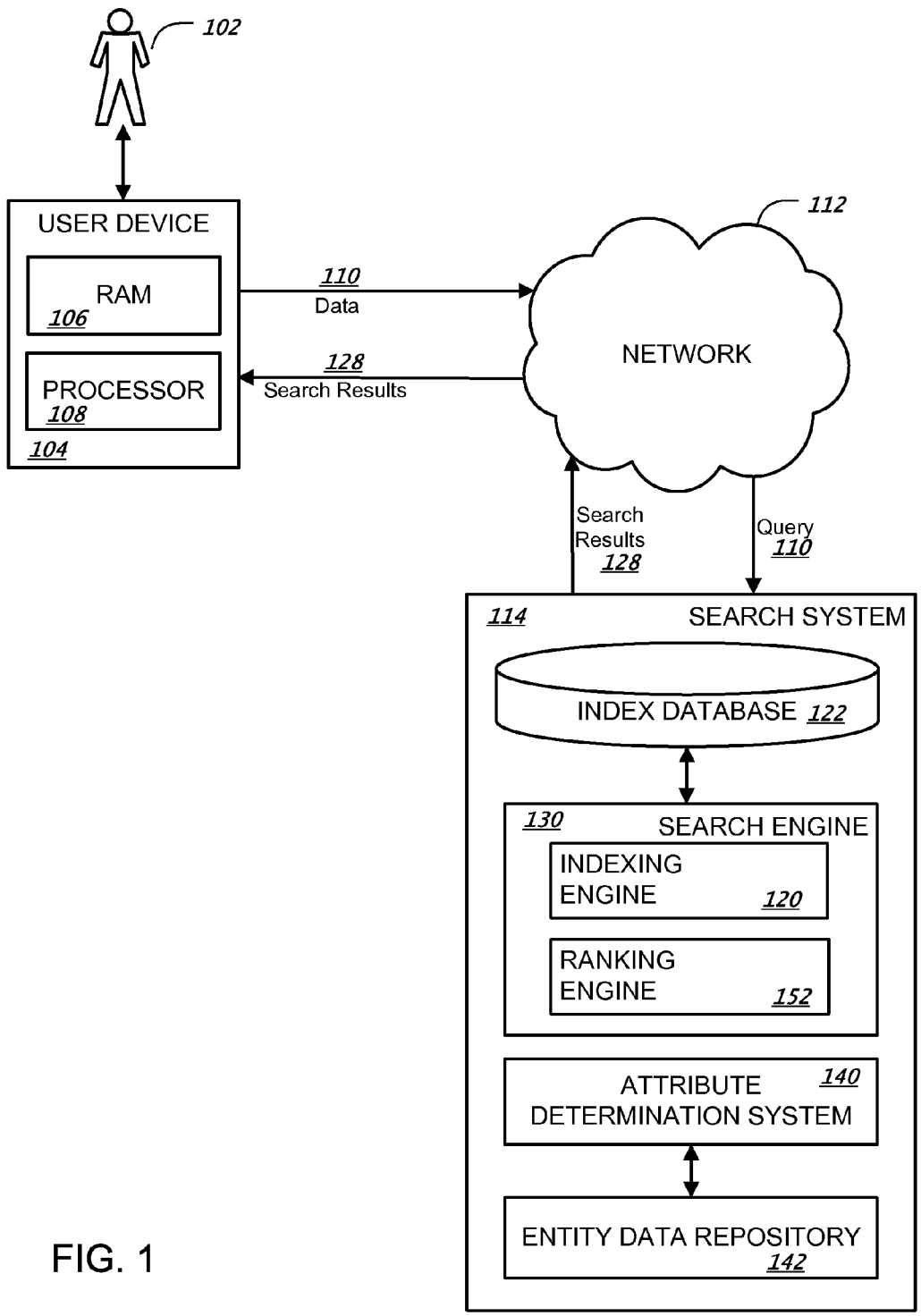
FIG. 1 is a schematic illustration of an example search system.

FIG. 1 shows an example search system 114. The search system 114 is an example of an information retrieval system implemented as computer programs on one or more computers in one or more locations, in which the systems, components, and techniques described below can be implemented.

A user 102 can interact with the search system 114 through a user device 104. The user device 104 will generally include a memory, e.g., a random access memory (RAM) 106, for storing instructions and data and a processor 108 for executing stored instructions. The memory can include both read only and writable memory. For example, the user device 104 can be a computer coupled to the search system 114 through a data communication network 112, e.g., local area network (LAN) or wide area network (WAN), e.g., the Internet, or a combination of networks, any of which may include wireless links.

The user device 104 can be a smartphone, tablet, a desktop computer, or a laptop computer. The user device 104 is capable of receiving user input, e.g., through a touchscreen display or a pointing device, e.g., a mouse.

In some implementations, the search system 114 provides a user interface to the user device 104 through which the user 102 can interact with the search system 114. For example, the search system 114 can provide a user interface in the form of web pages that are rendered by a web browser running on the user device 104.

Figure 2B:
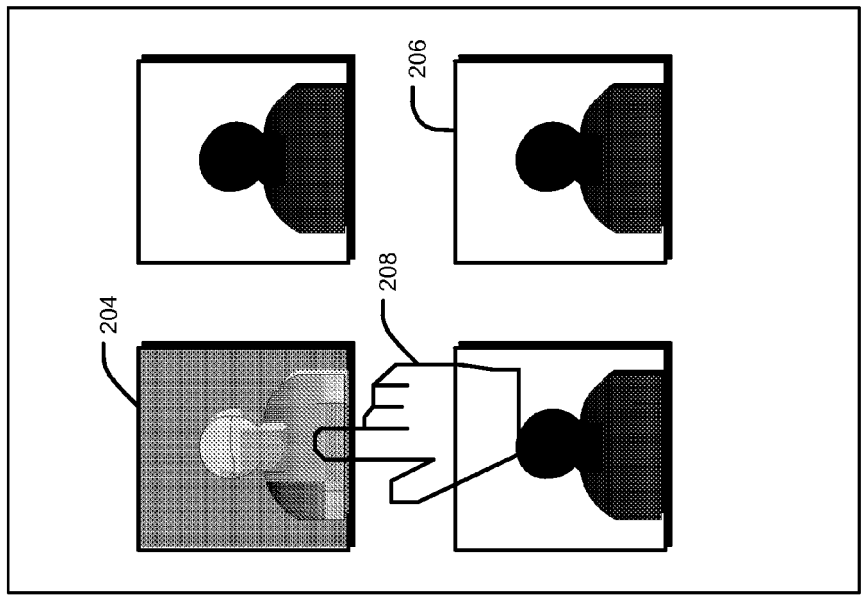
FIGS. 2A-D are diagrams illustrating an example user interface for requesting search results by user interface gesture combining display objects.
Figure 2A:
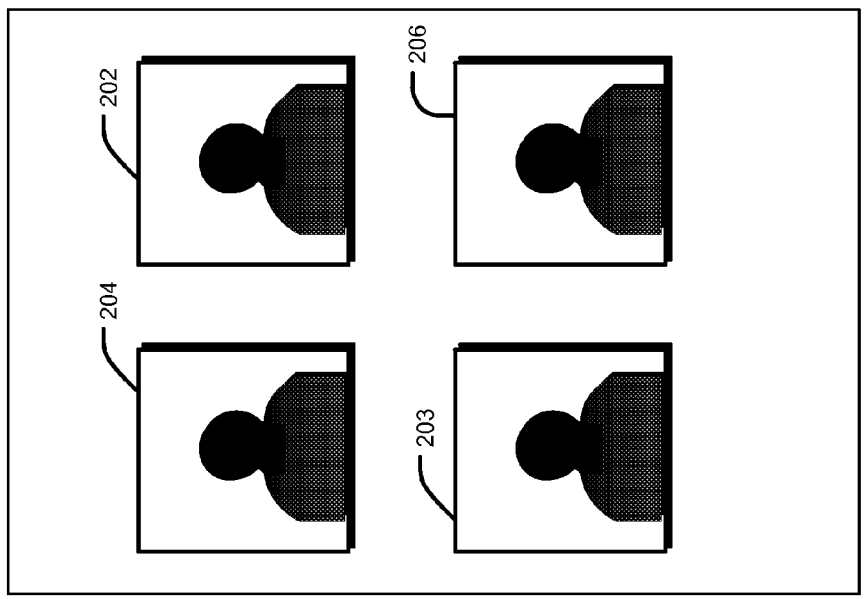

The user interface can include display objects that represent entities, as illustrated, for example, in FIG. 2A. Such representations can be included, for example, in a search engine results page. An entity, as noted above, is a data element that represents a person, place, thing, or concept. A display object representing an entity could be, for example, a picture of the person represented by the entity, or a picture of a place represented by the entity. The search system can obtain entity-related data from an entity data repository 142. In particular, the search system can obtain attribute data. An entity representing a person can have a number of attributes, including formal name text, common name text, photograph, milestone dates, spouse and children's names, and so on. Entity attributes can be links to other entities representing relationships between the entities; for example, an entity representing a person A can have an attribute that is a link to a person B, where the link has a type that represents the relationship between A and B, e.g., "father of", if A is the father of B. Or, as another example, if B is a movie rather than a person, the link can represent that A appeared in the movie B. Entity attributes can also be property attributes representing a type of property and a value of the property. For example, a property attribute for an entity representing Albert Einstein could have a type "birthdate" and a value "18790314".

The user 102 can use the user device 104 to submit data 110, e.g., data representing a first display object and a second display object, each representing an entity, to the search system 114. The search system 114 includes or can communicate with an attribute determination system 140 that determines attributes from the data 110, which will be described further below in reference to FIG. 3. The attribute determination system 140 obtain associations between attributes and entities from the entity data repository 142.

A search engine 130 within the search system 114 performs a search based on the attributes to identify resources matching the data 110. When the user 102 submits the data 110, the data 110 may be transmitted through the network 112 to the search system 114. The search system 114 includes an index database 122 and the search engine 130. The search system 114 responds to the data 110 by generating search results 128, which are transmitted through the network to the user device 104 for presentation to the user 102, e.g., as a search results web page to be displayed by a web browser running on the user device 104.

In this specification, the term "database" is used broadly to refer to any collection of data: the data does not need to be structured in any particular way, or structured at all, and it can be stored on multiple storage devices in one or more locations. Thus, for example, the index database 122 can include multiple collections of data, each of which may be organized and accessed differently. Similarly, in this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

When the data 110 is received by the search engine 130, the search engine 130 identifies resources that satisfy the data 110. The search engine 130 will generally include an indexing engine 120 that indexes resources, an index database 122 that stores the index information, and a ranking engine 152 or other software that generates scores for the resources that satisfy the query 110 and that ranks the resources according to their respective scores.

FIGS. 2A-D are diagrams illustrating an example user interface for requesting search results by user interface gesture combining display objects.

FIG. 2A is a diagram of a portion of a user interface that is displayed on a user device. The user interface 200 can present objects 202, 203, 204, 206 representing entities for display on the user device. The objects 202, 203, 204, 206 can be pictures, e.g., pictures of movie actors. In some implementations, the objects 202, 203, 204, 206 can be text objects for keywords or names. The objects 202, 203, 204, 206 can also be other representations, e.g., videos, sounds, and so on, of the entities.

FIG. 2B is a diagram of a portion of a user interface that displays object 204 being selected by user input. The user device receives user input 208 and provides visual feedback based on the user input 208. For example, if the user taps object 204 with a finger, the user interface can display the object 204 as grayed out.

Figure 2D:
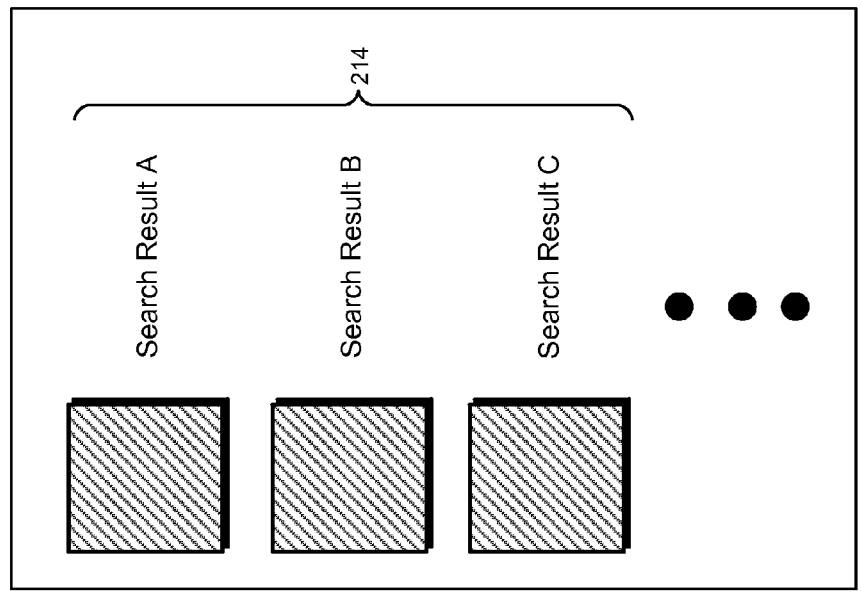
Figure 2C:
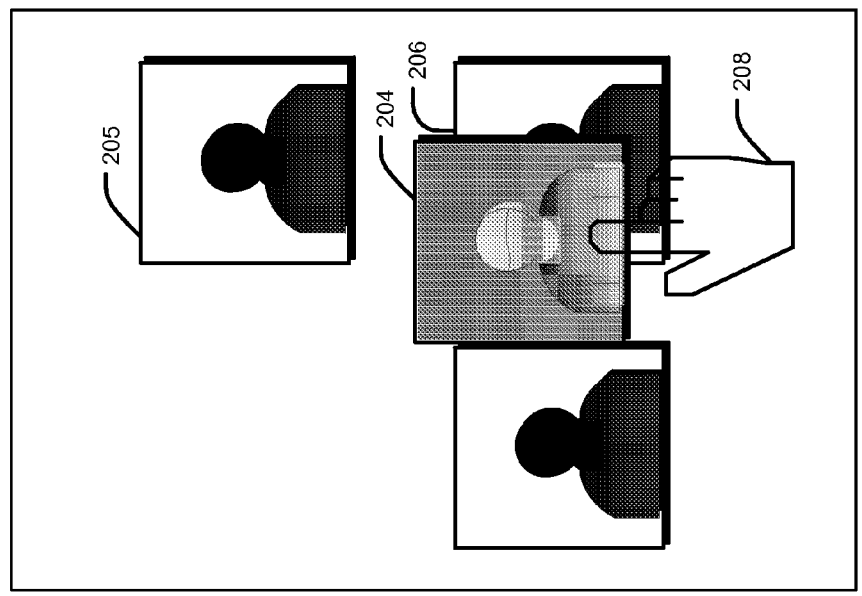

FIG. 2C is a diagram of a portion of a user interface that displays the selected object 204 being dragged over another object. The user device can receive user input 208 from a user that drags the selected object 204 onto another object 206. The user can release the selected object 204 when it overlaps the other object 206. In response to the user releasing the selected object 204, the user device sends a request to a search system to process user interface action. The request includes data representing the object 204 and the object 206. The search system generates search results that are relevant to both objects 204, 206, as will be discussed further below in reference to FIG. 3. The search system sends a response that includes the search results to the user device.

In some implementations, the user device can receive user input 208 that combines more than two objects together. In one example, after dragging the object 204 to overlap with another object 206 and releasing the object 204, the user can also drag a third object 205 onto the object 206 and release the third object 205. In this case, the user device sends, to the search system, a request to process the combined user action, including data representing the three objects 204, 205, and 206. The user device can also send a request to the search system after each release of an object.

In another example, the user can hold the object 204 for a predetermined amount of time, e.g., two seconds. After the object 204 is held, the user device can display a secondary user interface that indicates the user device has entered a secondary mode. In the secondary mode, the user can tap or click on the objects 205, 206 to select the objects 205, 206. The user device then sends request to process the combined user action, including data representing the three objects 204, 205, and 206 to the search system.

FIG. 2D is a diagram of a portion of a user interface that displays search results 214 received from the search server.

Figure 2E:
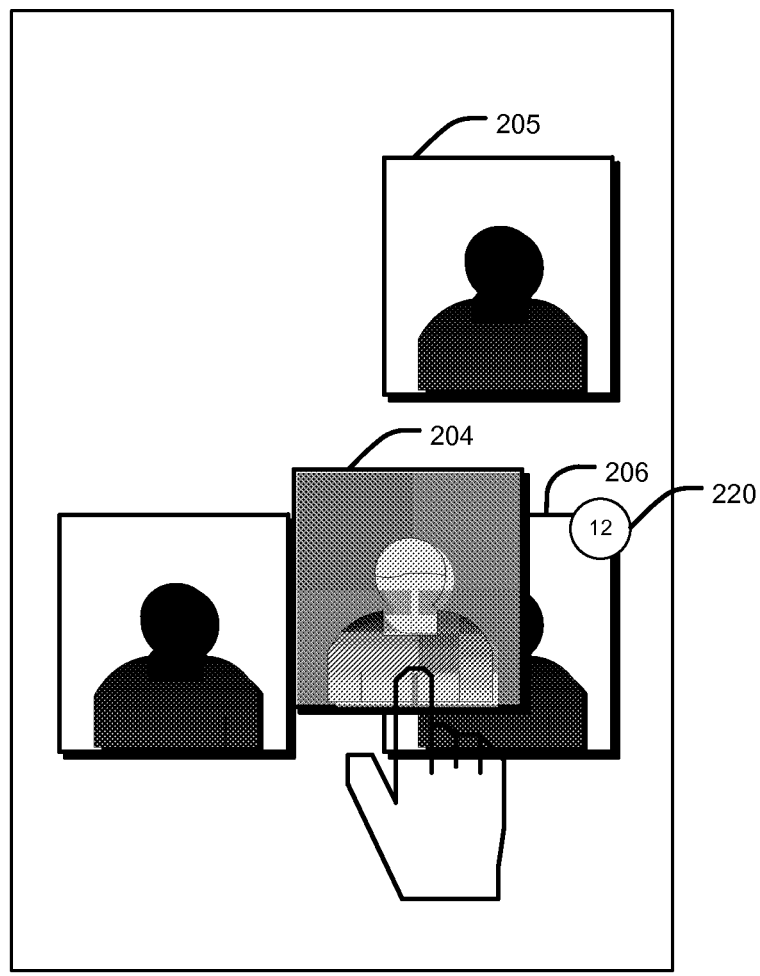
FIG. 2E is a diagram of an example user interface that displays a visual indication when the user drags a first object to overlap with a second object.

FIG. 2E is a diagram of a portion of a user interface that displays a visual indication 220 when the user drags object 204 to overlap with object 206. The visual indication 220 is a form of dynamic feedback that is displayed as the user moves objects over other parts of the user interface. In some implementations, before receiving input that releases object 204 on 206, the user device displays the visual indication 220 of whether a respective entity for the first object and a respective entity for the second object have attributes associated with each other, which will be described further below in reference to FIG. 3. By way of illustration, the visual indication 220 can indicate the respective entity for the first object and the respective entity for the second object have 12 attributes associated with each other. The visual indication 220 can also indicate a number of search results based on the respective entities.

Figure 3:
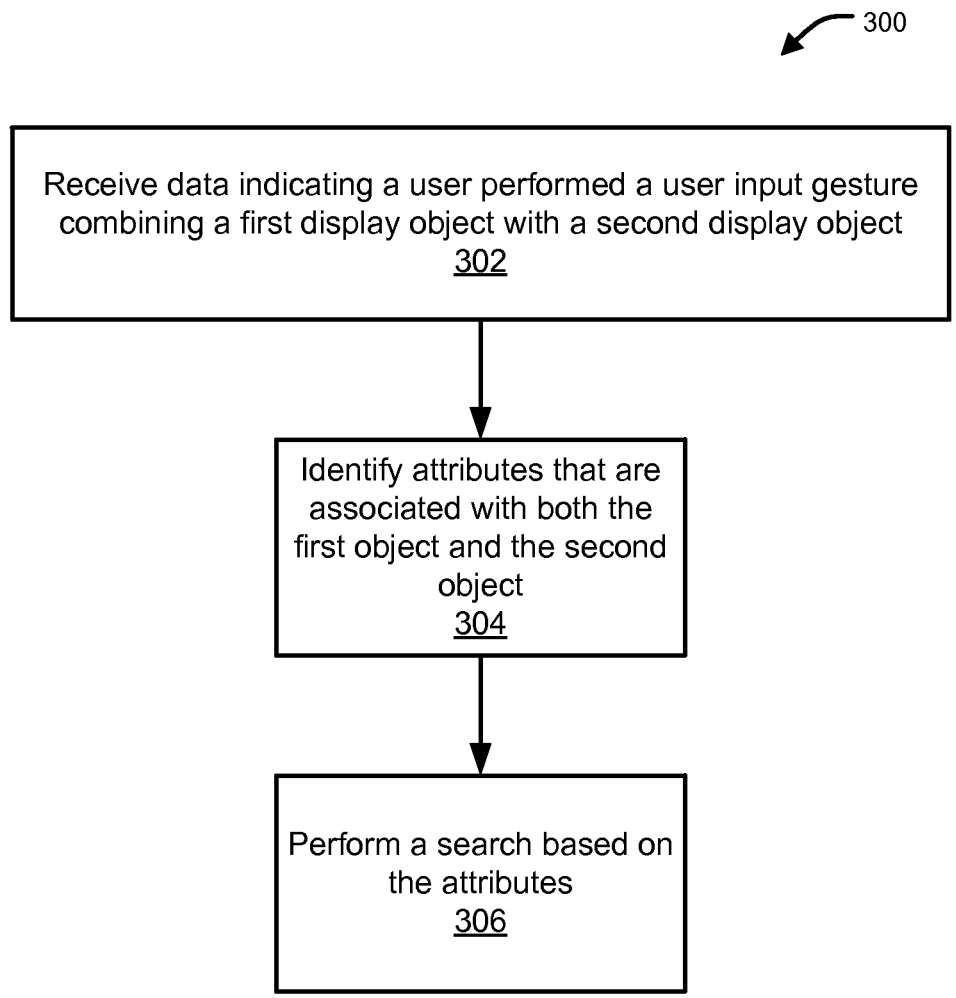
FIG. 3 is a flow chart illustrating an example method for combining representations of entities to display search results.

FIG. 3 is a flow chart illustrating an example method for requesting search results by user interface gesture combining display objects. For convenience, the method 300 will be described with respect to a system, e.g., the search system described in reference to FIG. 1, having one or more computing devices appropriately programmed to perform the method 300.

The system receives data indicating a user performed a user input gesture combining a first object with a second object (step 302). In some implementations, the user input gesture represents a user dragging the first object to overlap the second object and receives user input that represents the user releasing the first object while it overlaps the second object, as described above in reference to FIG. 2A-D. The first object and the second object are each associated with an entity. Each entity is a data element that represents a person, place, thing, or concept. Each entity is also searchable. That is, each entity can be associated with indexed resources, e.g., web pages. Therefore, a search engine can receive a query that refers to a particular searchable entity and can respond with search results that link to some of the indexed resources of the particular entity.

The system identifies attributes that are associated with both the first object and the second object (step 304). In particular, the system identifies attributes that are associated with both the respective entities represented by the first object and the second object. The system can identify the attributes from associations between attributes and entities obtained from the entity data repository 142 (FIG. 1).

For example, the first object can be an image of actor George Clooney. The second object can be an image of actor Brad Pitt. The first object is associated with a George Clooney entity, and the second object is associated with a Brad Pitt entity. The George Clooney entity can be associated with the following attributes: type "actor in" and related entity "Michael Clayton," type "actor in" and related entity "Oceans 11," and type "actor in" and related entity "Syriana." The Brad Pitt entity can be associated with attributes type "actor in" and related entity "Fight Club," type "actor in" and related entity "Se7en," and type "actor in" and related entity "Oceans 11."

The system can identify attributes that are both associated with the respective entities of the first object and the second object, e.g., type "actor in" and related entity "Oceans 11." In some implementations, the first object and the second object are images, and the system identifies attributes that represent visual similarities between the images. In particular, the visual similarities can be represented by similarities in color, texture, or shape. The system identifies attributes that represent the visual similarities, e.g., the attributes can be image features from an image database.

The system performs a search based on the identified attributes (step 306). The system processes the search using a search engine. The search engine provides, e.g., to device 102, results that match the attributes. In one example, the search engine provides results relevant to the movie "Ocean's 11." In another example, the search engine provides a list of movies that star both George Clooney and Brad Pitt. In some implementations, the system can process a combination of more than one user input gesture. In particular, the system processes user input that includes one or more additional user input gestures. Each additional user input gesture combines a corresponding display object with the first object or the second object, as described above in reference to FIG. 2A-D. The system identifies attributes that are associated with the respective entities of the first display object, the second display object, and each of the one or more corresponding display objects. The system then performs a search based on the identified attributes.

In some other implementations, the user device displays a visual indication before a user releases the first object that overlaps with the second object, as described above in reference to FIG. 2E. The visual indication can display an estimated number of search results.

In particular, the system receives data indicating a user input gesture that represents a user dragging the first display object to overlap the second display object. The system identifies attributes and performs a search based on the attributes, as described above. In response to performing the search, the system receives search results based on the search.

The system determines that one or more of the search results satisfy a threshold score. The threshold score can be a measure of how the entity associated with the first object is related to the entity associated with the second object. The system determines a score for each of the search results and compares the respective scores to the threshold score. The system can count a number of search results that satisfy the threshold score.

While the user is still holding the first display object, the system sends response data that represents the determination, e.g., a count of the number of search results, to the user device. The response data can be an indication that the respective entity for the first object has attributes in common with the respective entity for the second object, e.g., a check mark display object. The response data can also be a count of the one or more search results that satisfy the threshold store. The user device can display a visual indication of the data.

In alternative implementations, instead of performing the search based on the attributes while the user is still holding the first display object, the system counts the identified attributes and provides the count for display at the user device.

After the user releases the first display object and the user device receives search results from the system, the user can continue searching using the system the same user interface techniques. For example, the system can provide a list of movies that star both George Clooney and Brad Pitt. The user interface can include a movie object, e.g., a picture of the movie's poster, for each movie. The system can receive data indicating another user input gesture that combines one or more of the movie objects together. The system can identify common attributes for the movie entities and perform a search based on the attributes, as described above.

Although the system is described as identifying attributes for entities, the system can also be configured to identify attributes of display objects that represent the entities.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
    receiving, from a user device, data indicating a user performed a user input gesture combining a first display object in a plurality of non-textual display objects displayed on the user device with a second display object in the plurality of non-textual display objects;
    determining first attributes for the first display object and second attributes for the second display object;
    identifying attributes included in both the first attributes and the second attributes;
    automatically sending, to a web search engine, a search request comprising one or more search terms from each of the identified attributes in response to identifying the attributes included in both the first attributes and the second attributes;
    receiving web search results from the web search engine in response to the search request; and
    providing the web search results for display on the user device.

2. The method of claim 1, where the data indicating the user performed the user input gesture comprises (i) data representing a user dragging the first display object to overlap the second display object, and (ii) data representing the user releasing the first display object while the first display object overlaps the second display object.

3. The method of claim 1, further comprising:
    retrieving first data for the first display object and second data for the second display object, where the first data includes indexed resources for a first entity and the second data includes indexed resources for a second entity, and the first data and the second data each represent an association between the respective entity and the respective display object;
    where identifying the attributes included in both the first attributes and the second attributes comprises identifying attributes that are associated with both the first entity and the second entity.

4. The method of claim 1, where the first display object and the second display object are a first image and a second image, respectively, and where identifying the attributes included in both the first attributes and the second attributes comprises:
    identifying visual similarities between the first image and the second image, where the visual similarities comprise similarities in color, texture, or shape; and
    identifying attributes that represent the visual similarities.

5. The method of claim 1, where identifying the attributes included in both the first attributes and the second attributes comprises:
    identifying a first entity associated with the first display object, wherein the first entity is a data element that represents a first person, place, thing, or concept;
    identifying a second entity associated with the second display object, wherein the second entity is a data element that represents a second person, place, thing, or concept; and
    identifying attributes that are associated with both the first person, place, thing, or concept and the second person, place, thing, or concept.

6. The method of claim 1, comprising:
    prior to identifying the attributes included in both the first attributes and the second attributes, receiving one or more additional user input gestures, where each additional user input gesture combines a corresponding display object with the first display object or the second display object, and where identifying the attributes included in both the first attributes and the second attributes comprises identifying attributes included in both the first attributes and the second attributes and that are associated with each of the one or more corresponding display objects.

7. The method of claim 1, further comprising:
    determining a threshold score that is a measure of how the first object is related to the second object;
    determining that one or more of the search results satisfy the threshold score;
    sending, to the user device, response data representing the determination, where the user device displays a visual indication of the response data.

8. A system comprising:
    a processor; and
    a non-transitory computer-readable medium coupled to the processor and having instructions stored thereon, which, when executed by the processor, cause the processor to perform operations comprising:
        receiving, from a user device, data indicating a user performed a user input gesture combining a first display object in a plurality of non-textual display objects displayed on the user device with a second display object in the plurality of non-textual display objects;
        determining first attributes for the first display object and second attributes for the second display object;
        identifying attributes included in both the first attributes and the second attributes;
        automatically sending, to a web search engine, a search request comprising one or more search terms from each of the identified attributes in response to identifying the attributes included in both the first attributes and the second attributes;

receiving web search results from the web search engine in response to the search request; and providing the web search results for display on the user device.

9. The system of claim 8, where the data indicating the user performed the user input gesture comprises (i) data representing a user dragging the first display object to overlap the second display object, and (ii) data representing the user releasing the first display object while the first display object overlaps the second display object.

10. The system of claim 8, the operations further comprising:

retrieving first data for the first display object and second data for the second display object, where the first data includes indexed resources for a first entity and the second data includes indexed resources for a second entity, and the first data and the second data each represent an association between the respective entity and the respective display object;

where identifying the attributes included in both the first attributes and the second attributes comprises identifying attributes that are associated with both the first entity and the second entity.

11. The system of claim 8, where the first display object and the second display object are a first image and a second image, respectively, and where identifying the attributes included in both the first attributes and the second attributes comprises:

identifying visual similarities between the first image and the second image, where the visual similarities comprise similarities in color, texture, or shape; and identifying attributes that represent the visual similarities.

12. The system of claim 8, where identifying the attributes included in both the first attributes and the second attributes comprises:

identifying a first entity associated with the first display object, wherein the first entity is a data element that represents a first person, place, thing, or concept;

identifying a second entity associated with the second display object, wherein the second entity is a data element that represents a second person, place, thing, or concept; and identifying attributes that are associated with both the first person, place, thing, or concept and the second person, place, thing, or concept.

13. The system of claim 8, the operations further comprising:

prior to identifying the attributes included in both the first attributes and the second attributes, receiving one or more additional user input gestures, where each additional user input gesture combines a corresponding display object with the first display object or the second display object, and where identifying the attributes included in both the first attributes and the second attributes comprises identifying attributes included in both the first attributes and the second attributes and that are associated with each of the one or more corresponding display objects.

14. The system of claim 8, the operations further comprising:

determining a threshold score that is a measure of how the first object is related to the second object;

determining that one or more of the search results satisfy the threshold score;

sending, to the user device, response data representing the determination, where the user device displays a visual indication of the response data.

15. A non-transitory computer-readable medium having instructions stored thereon, which, when executed by a processor, cause the processor to perform operations comprising:

receiving, from a user device, data indicating a user performed a user input gesture combining a first display object in a plurality of non-textual display objects displayed on the user device with a second display object in the plurality of non-textual display objects;

determining first attributes for the first display object and second attributes for the second display object;

identifying attributes included in both the first attributes and the second attributes;

automatically sending, to a web search engine, a search request comprising one or more search terms from each of the identified attributes in response to identifying the attributes included in both the first attributes and the second attributes;

receiving web search results from the web search engine in response to the search request; and providing the web search results for display on the user device.

16. The non-transitory computer-readable medium of claim 15, where the data indicating the user performed the user input gesture comprises (i) data representing a user dragging the first display object to overlap the second display object, and (ii) data representing the user releasing the first display object while the first display object overlaps the second display object.

17. The non-transitory computer-readable medium of claim 15, the operations further comprising:

retrieving first data for the first display object and second data for the second display object, where the first data includes indexed resources for a first entity and the second data includes indexed resources for a second entity, and the first data and the second data each represent an association between the respective entity and the respective display object;

where identifying the attributes included in both the first attributes and the second attributes comprises identifying attributes that are associated with both the first entity and the second entity.

18. The non-transitory computer-readable medium of claim 15, where the first display object and the second display object are a first image and a second image, respectively, and where identifying the attributes included in both the first attributes and the second attributes comprises:

identifying visual similarities between the first image and the second image, where the visual similarities comprise similarities in color, texture, or shape; and identifying attributes that represent the visual similarities.

19. The non-transitory computer-readable medium of claim 15, where identifying the attributes included in both the first attributes and the second attributes comprises:

identifying a first entity associated with the first display object, wherein the first entity is a data element that represents a first person, place, thing, or concept;

identifying a second entity associated with the second display object, wherein the second entity is a data element that represents a second person, place, thing, or concept; and identifying attributes that are associated with both the first person, place, thing, or concept and the second person, place, thing, or concept.

20. The non-transitory computer-readable medium of claim 15, the operations further comprising:
prior to identifying the attributes included in both the first attributes and the second attributes, receiving one or more additional user input gestures, where each additional user input gesture combines a corresponding display object with the first display object or the second display object, and where identifying the attributes included in both the first attributes and the second attributes comprises identifying attributes included in both the first attributes and the second attributes and that are associated with each of the one or more corresponding display objects.

21. The non-transitory computer-readable medium of claim 15, the operations further comprising:
determining a threshold score that is a measure of how the first object is related to the second object;
determining that one or more of the search results satisfy the threshold score;
sending, to the user device, response data representing the determination, where the user device displays a visual indication of the response data.

22. The method of claim 1, comprising:
identifying a first entity associated with the first display object; and
identifying a second entity associated with the second display object, wherein determining the first attributes for the first display object and the second attributes for the second display object comprises:
determining the first attributes for the first entity; and
determining the second attributes for the second entity.

23. The system of claim 8, the operations further comprising:
identifying a first entity associated with the first display object; and
identifying a second entity associated with the second display object, wherein determining the first attributes for the first display object and the second attributes for the second display object comprises:
determining the first attributes for the first entity; and
determining the second attributes for the second entity.

24. The non-transitory computer-readable medium of claim 15, the operations further comprising:
identifying a first entity associated with the first display object; and
identifying a second entity associated with the second display object, wherein determining the first attributes for the first display object and the second attributes for the second display object comprises:
determining the first attributes for the first entity; and
determining the second attributes for the second entity.

* * * * *